(12) United States Patent
Ueda et al.

(10) Patent No.: US 8,002,479 B2
(45) Date of Patent: Aug. 23, 2011

(54) IMAGING APPARATUS

(75) Inventors: Toshiaki Ueda, Saitama (JP); Hideo Fukumoto, Hyogo (JP); Takuya Hara, Osaka (JP); Yoshinori Sugiyama, Osaka (JP); Shigekazu Inaba, Aichi (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/661,813

(22) Filed: Mar. 24, 2010

(65) Prior Publication Data

US 2010/0254700 A1    Oct. 7, 2010

(30) Foreign Application Priority Data

Apr. 2, 2009    (JP) ............................... P2009-089870

(51) Int. Cl.
*G03B 19/12*    (2006.01)
(52) U.S. Cl. ........................................ 396/354; 396/541
(58) Field of Classification Search .................. 396/354, 396/529, 535, 539, 541; 348/360, 373–376
See application file for complete search history.

(56) References Cited

U.S. PATENT DOCUMENTS

| | | | | |
|---|---|---|---|---|
| 4,417,796 A | * | 11/1983 | Sugiura et al. | 396/357 |
| 5,659,825 A | * | 8/1997 | Dobashi | 396/357 |
| 7,250,972 B2 | | 7/2007 | Oshima | |
| 2002/0025168 A1 | * | 2/2002 | Sugita et al. | 396/541 |
| 2005/0185951 A1 | * | 8/2005 | Terada et al. | 396/535 |

FOREIGN PATENT DOCUMENTS

JP    2004-104168 A    4/2004

* cited by examiner

*Primary Examiner* — W. B. Perkey
(74) *Attorney, Agent, or Firm* — Lerner, David, Littenberg, Krumholz & Mentlik, LLP (57) ABSTRACT

An imaging apparatus includes: a mount fixing member to which a lens mount is fixed; a connected body obtained by integrally connecting a plurality of constituent units including a battery holder unit, the plurality of constituent units provided around the mount fixing member; and a front member fixed to the connected body and integrated therewith, wherein the mount fixing member is fixed to the front member.

10 Claims, 8 Drawing Sheets

IMAGING APPARATUS

CROSS-REFERENCE TO RELATED APPLICATION

The present application claims priority from Japanese Patent Application No. JP 2009-089870 filed in the Japanese Patent Office on Apr. 2, 2009, the entire content of which is incorporated herein by reference.

BACKGROUND OF THE INVENTION

1. Field of the Invention

The present invention relates to a digital camera and other imaging apparatus.

2. Description of the Related Art

An imaging apparatus is typically required to suppress deformation resulting from an external force, for example, an external force applied to an imaging lens. In particular, an interchangeable lens camera is typically required to suppress deformation resulting from an external force transmitted from the imaging lens through a lens mount to an imaging apparatus body. To this end, the imaging apparatus is strengthened, for example, by forming a main chassis with a metal plate.

For example, JP-A-2004-104168 describes an imaging apparatus including a connection box provided with a lens mount, an imaging device unit, and a main chassis disposed between the connection box and the imaging device unit. The main chassis extends over a relatively large area in the width and height directions of the imaging apparatus body. In the technology described in JP-A-2004-104168, the main chassis is formed of a metal plate to strengthen the imaging apparatus.

SUMMARY OF THE INVENTION

Forming the main chassis, which extends in the width and height directions of the imaging apparatus body and has a large area, with a metal plate in order to strengthen the imaging apparatus, however, disadvantageously increases the weight of the main chassis and hence the weight of the imaging apparatus.

It is therefore desirable to provide an imaging apparatus capable of suppressing deformation resulting from an external force and being reduced in weight at the same time.

According to an embodiment of the invention, there is provided an imaging apparatus including a mount fixing member to which a lens mount is fixed, a connected body obtained by integrally connecting a plurality of constituent units including a battery holder unit, the plurality of constituent units provided around the mount fixing member, and a front member fixed to the connected body and integrated therewith, and the mount fixing member is fixed to the front member.

According to the embodiment of the invention, deformation resulting from an external force can be suppressed and the weight can be reduced at the same time.

DETAILED DESCRIPTION OF THE INVENTION

A form in which the invention is implemented (hereinafter also referred to as an "embodiment") will be described below. The description will be made in the following order:
<1. Summary of configuration>
<2. <Detailed configuration>
<3. <Variations and others>
<1. Summary of Configuration>

Figure 1:
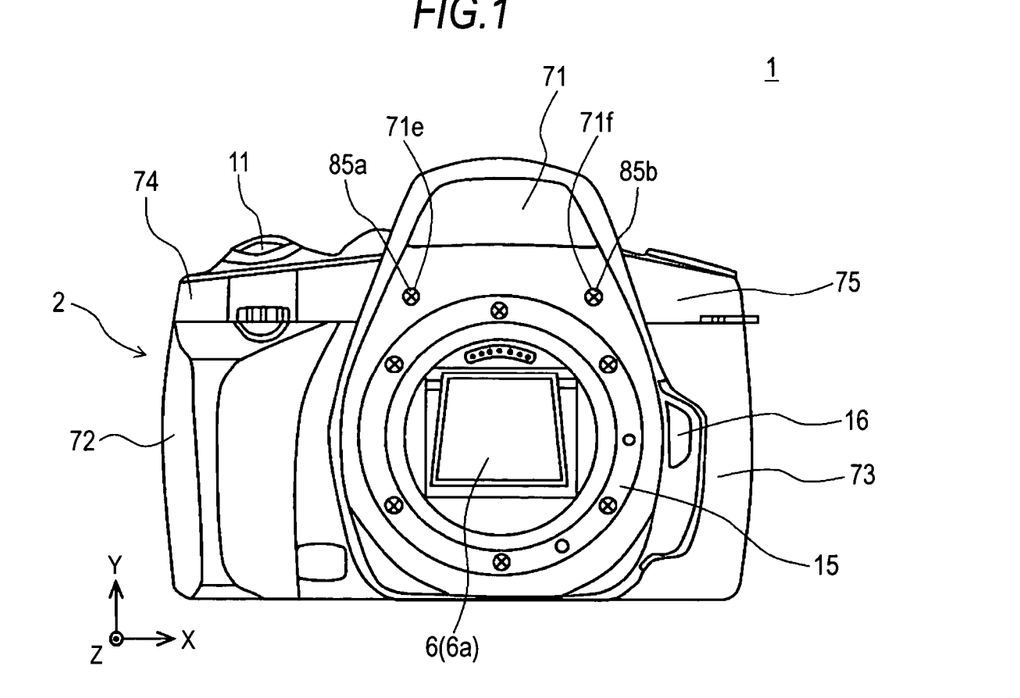
FIG. 1 is a front view of an imaging apparatus.
Figure 2:
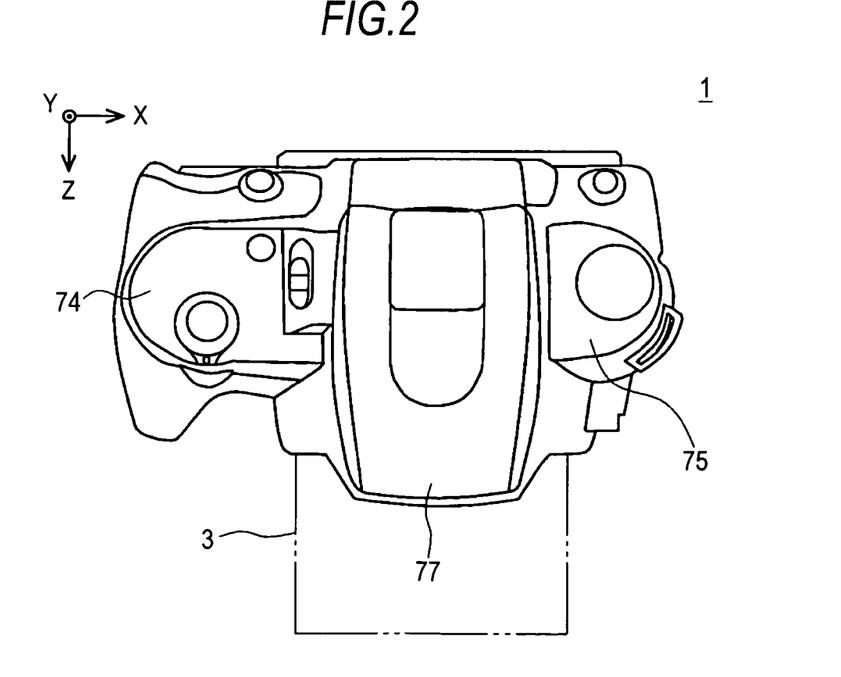
FIG. 2 is a top view of the imaging apparatus.
Figure 3:
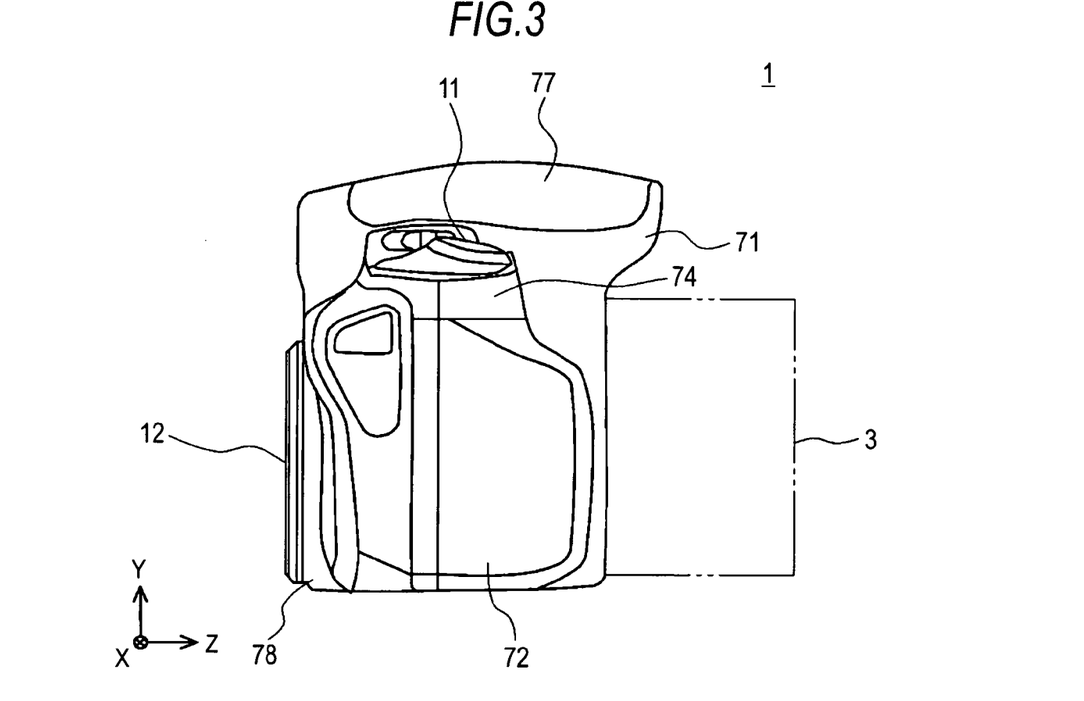
FIG. 3 is a side view of the imaging apparatus.
Figure 4:
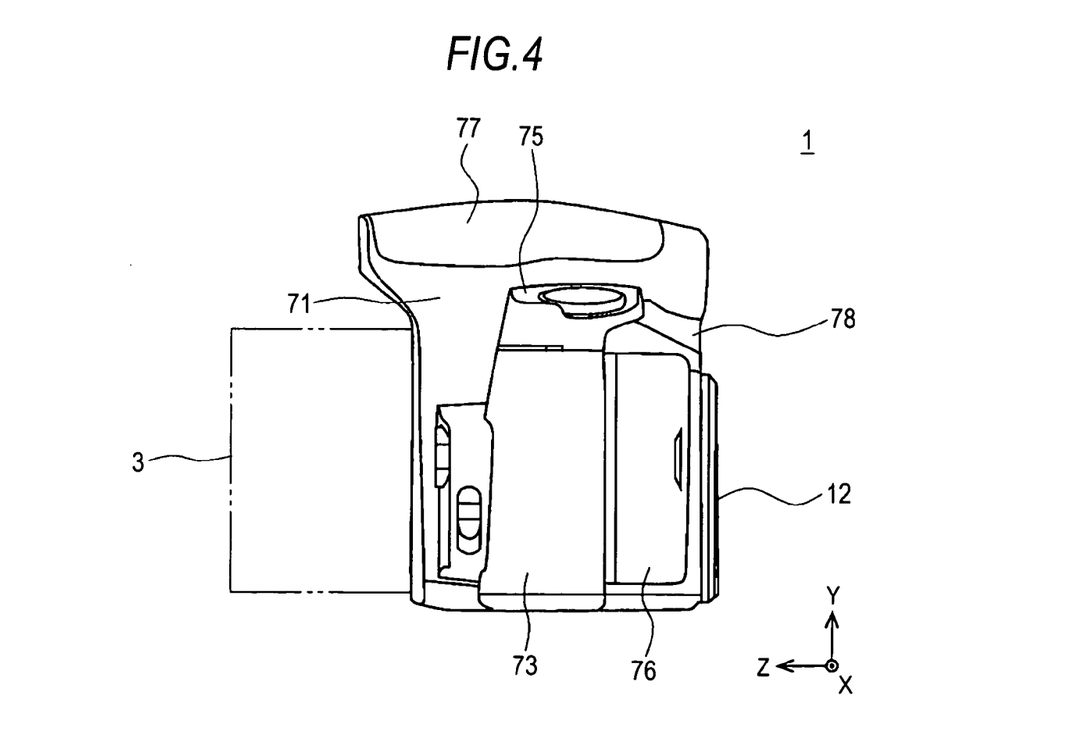
FIG. 4 is another side view of the imaging apparatus.
Figure 5:
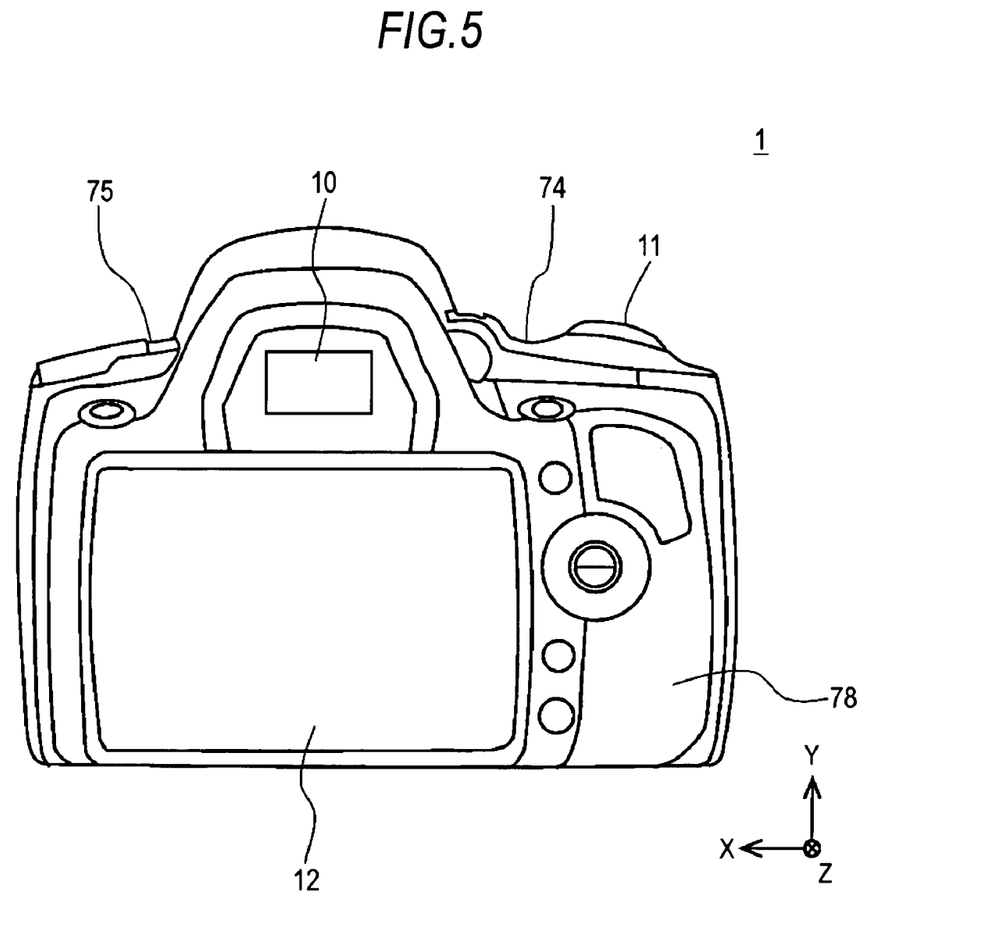
FIG. 5 is a rear view of the imaging apparatus.
Figure 6:
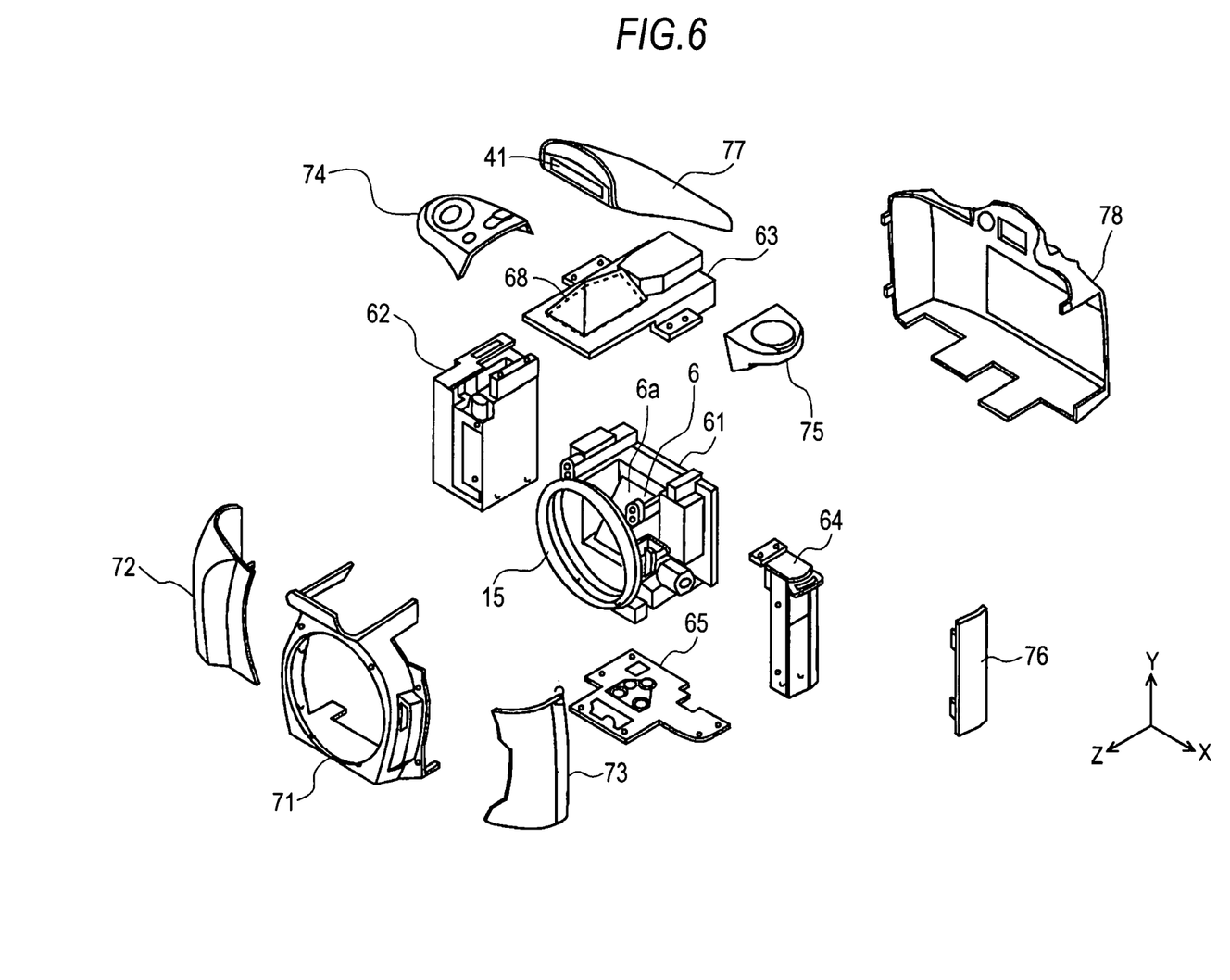
FIG. 6 is an exploded perspective view of the imaging apparatus.
Figure 7:
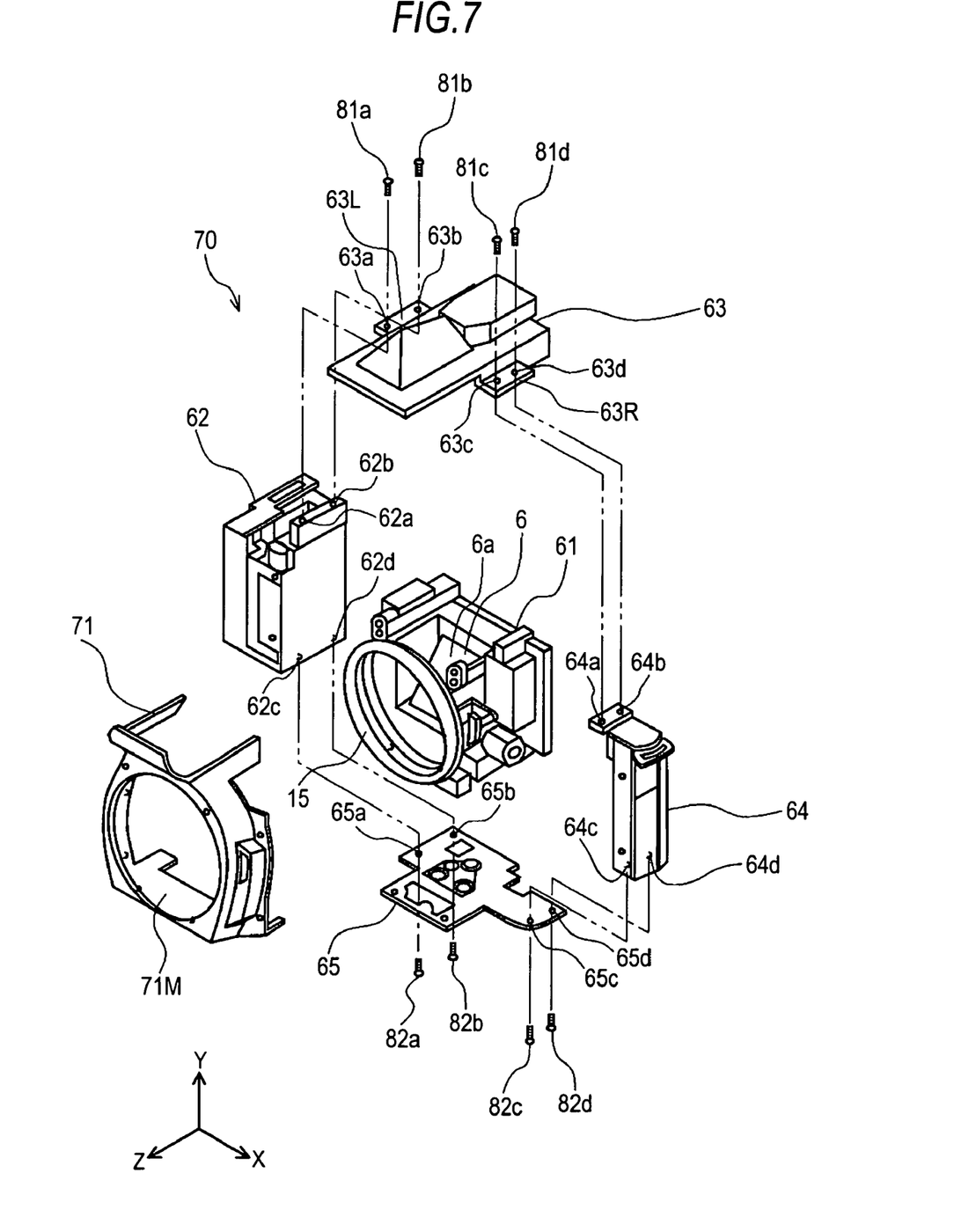
FIG. 7 is another exploded perspective view of the imaging apparatus.
Figure 8:
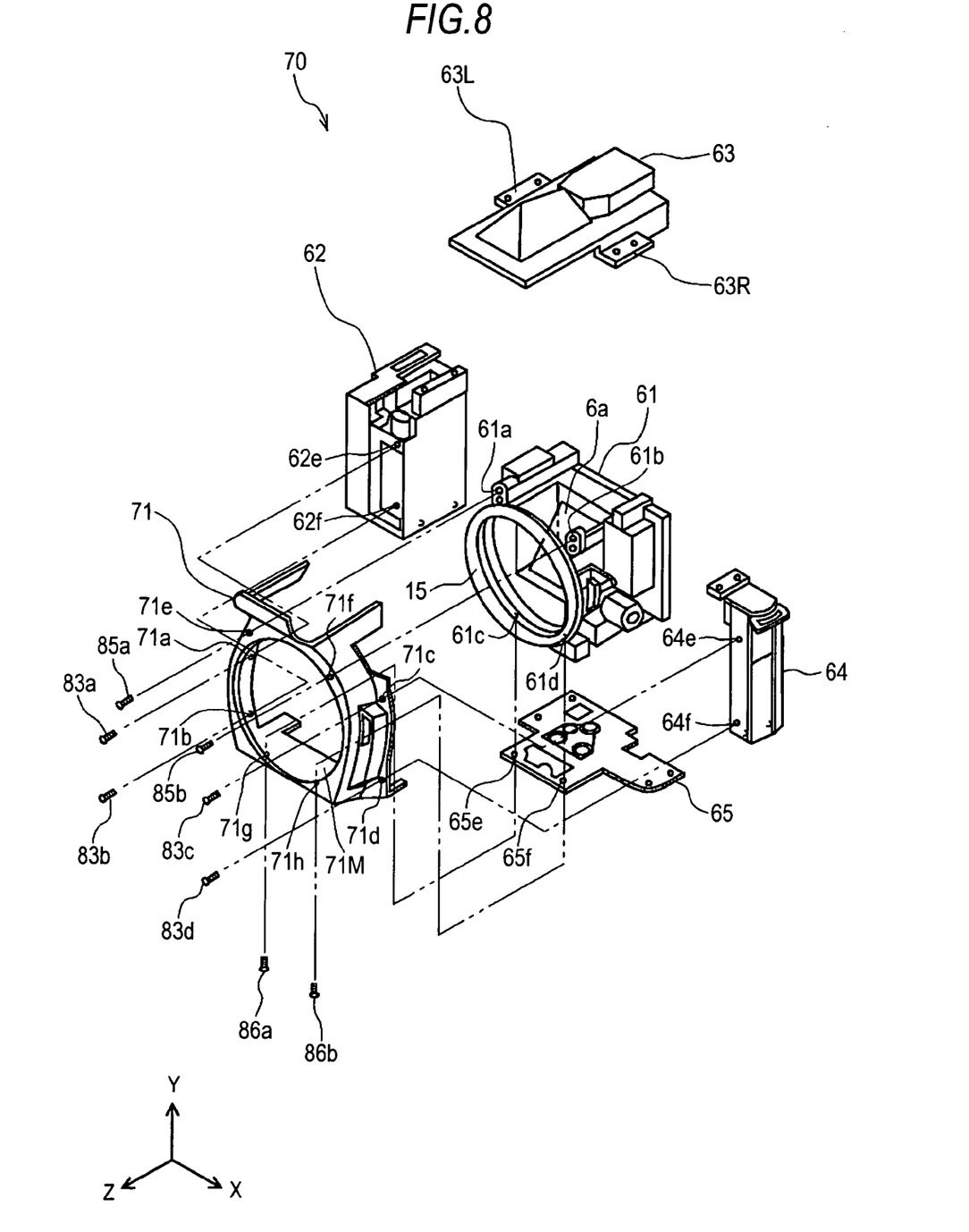
FIG. 8 is another exploded perspective view of the imaging apparatus.

FIG. 1 is a front view of an imaging apparatus 1 according to the embodiment. FIG. 2 is a top view of the imaging apparatus 1. FIGS. 3 and 4 are side views of the imaging apparatus 1. FIG. 5 is a rear view of the imaging apparatus 1. FIGS. 6 to 8 are exploded perspective views of the imaging apparatus 1. FIGS. 7 and 8 particularly show how part of the components of the imaging apparatus 1 are connected. In FIGS. 1 to 8, a common XYZ orthogonal coordinate system is used to indicate, for example, directions.

The imaging apparatus 1 is configured as an interchangeable single-lens reflex digital camera.

As shown in FIG. 1, the imaging apparatus 1 includes a camera body (apparatus body) 2. An interchangeable (detachable) imaging lens unit (interchangeable lens) 3 (see FIG. 2) can be attached to the camera body 2. The imaging lens unit 3 is primarily formed of a lens barrel, and a group of lenses, an aperture, and other components provided in the lens barrel.

The camera body 2 includes an annular lens mount 15 (FIG. 1) disposed in a substantially central portion of the front side of the camera body 2 and an attachment/detachment button 16 disposed in the vicinity of the annular lens mount 15. The imaging lens unit 3 is attached to the annular lens mount 15, and the attachment/detachment button 16 is used to attach and detach the imaging lens unit 3. It is noted that each of the drawings shows a state in which the imaging lens unit 3 is detached, but imaging operations are carried out with the imaging lens unit 3 attached.

A flashlight (also referred to as a strobe light) 41 (see FIG. 6) that emits auxiliary light used in imaging operations is provided on the upper side of the imaging apparatus 1. The flashlight 41 is a light source used, for example, when a subject lacks sufficient brightness. The flashlight 41 is fixed to a strobe light cover 77 (FIG. 6), which will be described later.

A release button 11 is provided on the upper left side of the imaging apparatus 1 when viewed from the front (on the upper right side when viewed from the rear).

The release button 11 is a two-stage detection button capable of detecting two states, a half-pressed state (S1 state) and a fully-pressed state (S2 state). When the release button 11 is pressed halfway into the S1 state, the imaging apparatus 1 interprets the state as an imaging preparation instruction and imaging preparation actions (an AF control action, for example) for capturing a still image of a subject to be recorded (final captured image) are carried out. When the release button 11 is further pressed into the S2 state, the imaging apparatus 1 interprets the state as an imaging instruction and imaging actions of capturing the final captured image are carried out.

A battery holder unit 62 (FIG. 6) is provided in the apparatus behind a first grip cover 72 (FIG. 1) located on the left side of the imaging apparatus 1 when viewed from the front (on the right side when viewed from the rear), and a battery compartment is provided in the battery holder unit 62. The battery compartment detachably houses a lithium-ion battery or any other suitable battery as a power source of the camera.

A side frame unit 64 is provided in the apparatus behind a second grip cover 73 (see FIGS. 1 and 6) located on the right side of the imaging apparatus 1 when viewed from the front (on the left side when viewed from the rear), and a card compartment is provided in the side frame unit 64. The card compartment detachably houses a memory card for recording captured image data.

A backside monitor 12 (see FIG. 5) is provided on the back side of the imaging apparatus 1. The backside monitor 12 is, for example, a color liquid crystal display (LCD). The backside monitor 12 can, for example, display a menu screen for setting imaging and other conditions, and reproduce and display in a reproducing mode a captured image recorded on the memory card.

<2. Detailed Configuration>

As shown in FIG. 6, the imaging apparatus 1 further includes a mirror box unit 61 in a substantially central portion of the imaging apparatus 1. The mirror box unit 61 has a substantially hollow box-like shape.

An imaging device 5 (see FIG. 10) is fixed and held on the rear side in the internal space in the mirror box unit 61. The imaging device (CMOS sensor, for example) 5 is a light receiving device that carries out photoelectric conversion to convert an optical image of the subject (subject image) having passed through the imaging lens unit 3 into an electric signal, and produces and acquires an image signal representing a final captured image (image signal to be recorded).

A mirror mechanism 6 is provided in a substantially central portion of the internal space in the mirror box unit 61. The mirror mechanism 6 includes a primary mirror 6a (reflection member) that can be lifted and lowered. When lowered, the primary mirror 6a changes the path of the light (subject image) having passed through the imaging lens unit 3 (imaging optical system) to be oriented upward. The reflected light reaches the eye of a photographing user via a penta mirror 68 (FIG. 6), a finder window 10 (FIG. 5), and other components. The photographing user can thus observe the subject image through the optical finder. On the other hand, when the primary mirror 6a is lifted, the light (subject image) having passed through the imaging lens unit 3 (imaging optical system) reaches the imaging device 5 without being blocked by the primary mirror 6a, and the imaging device 5 produces a captured image.

Further, the lens mount 15 is fixed to the mirror box unit 61 in front of the internal space therein. The lens mount 15 is a member to which the detachable imaging lens unit 3 is attached. The mirror box unit 61 is also called a mount fixing member to which the lens mount 15 is fixed.

The camera body 2 further includes a plurality of constituent units around the mirror box unit 61 (specifically, around the optical axis of the imaging lens unit 3). Specifically, the battery holder unit 62 is disposed on the left when the mirror box unit 61 is viewed from the front, and the side frame unit 64 is disposed on the right when the mirror box unit 61 is viewed from the front. Further, a strobe light base unit 63 is disposed above the mirror box unit 61, and a bottom frame unit 65 is disposed below (on the bottom side of) the mirror box unit 61. The strobe light base unit 63 is also referred to as an upper unit, and the bottom frame unit 65 is also referred to as a lower unit. Each of the battery holder unit 62 and the side frame unit 64 is also referred to as a side unit.

Among the constituent units described above, the three constituent units other than the bottom frame unit 65 (that is, the battery holder unit 62, the strobe light base unit 63, and the side frame unit 64) include respective housings made of resin materials. Forming the housings by using resin materials (instead of metal materials) allows further reduction in weight. On the other hand, the bottom frame unit 65 is shaped into a thin plate and made of a metal. The thus configured bottom frame unit 65 allows the height of the imaging apparatus 1 to be reduced and sufficient strength to be reliably provided when the bottom of the imaging apparatus 1 is fixed onto a tripod. The bottom frame unit 65 is, however, not necessarily made of a metal, but may alternatively be made of a resin material.

FIG. 7 shows the relationship among the plurality of constituent units 62, 63, 64, and 65. As shown in FIG. 7, the plurality of constituent units, specifically, the battery holder unit 62, the strobe light base unit 63, the side frame unit 64, and the bottom frame unit 65 are integrally connected with each other with screws or any other suitable fasteners. The plurality of constituent units 62, 63, 64, and 65 are integrated when assembled and form a connected body 70. Each of the plurality of constituent units 62, 63, 64, and 65 is fixed to each of the adjacent units at two or more points (two points in the present embodiment) spaced apart in the depth direction of the imaging apparatus 1.

Specifically, the strobe light base unit 63 and the battery holder unit 62 are fixed to each other at two points (two locations) with two screws 81a and 81b. The two screws 81a and 81b pass through through holes 63a and 63b provided in a left shoulder 63L of the strobe light base unit 63 and are screwed into threaded holes 62a and 62b provided in the upper surface of the battery holder unit 62. The through holes 63a and 63b and the threaded holes 62a and 62b are respectively spaced apart by a predetermined distance in the depth direction (Z direction) of the imaging apparatus 1. The two screws 81a and 81b spaced apart in the Z direction are used to fix the strobe light base unit 63 to the battery holder unit 62. In this configuration, a moment acting around an axis parallel to the X axis resulting from an external force applied to the vicinity of the screw-fastened portions (hereinafter also referred to as a moment Mx) unlikely results in deformation. Similarly, a moment acting around an axis parallel to the Y axis resulting from an external force applied to the vicinity of the screw-fastened portions (hereinafter also referred to as a moment My) unlikely results in deformation. Further, the fastening by using the screws 81a and 81b allows the lower surface of the left shoulder 63L of the strobe light base unit 63 to be in surface-contact with and connected to the upper surface of the battery holder unit 62 around the screw-fastened portions. In this configuration, a moment acting around an axis parallel to the Z axis resulting from an external force applied to the vicinity of the screw-fastened portions (hereinafter also referred to as a moment Mz) also unlikely results in deformation. The configuration allows the battery holder unit 62 to stably hold the strobe light base unit 63.

Similarly, the strobe light base unit 63 and the side frame unit 64 are fixed to each other at two points (two locations) with two screws 81c and 81d. The two screws 81c and 81d pass through through holes 63c and 63d provided in a right shoulder 63R of the strobe light base unit 63 and are screwed into threaded holes 64a and 64b provided in the upper surface of the side frame unit 64. The through holes 63*c* and 63*d* and the threaded holes 64*a* and 64*b* are respectively spaced apart by a predetermined distance in the depth direction (Z direction) of the imaging apparatus 1. The two screws 81*c* and 81*d* spaced apart in the Z direction are used to fix the strobe light base unit 63 to the side frame unit 64. In this configuration, moments Mx and My unlikely result in deformation. Further, the fastening by using the screws 81*c* and 81*d* allows the lower surface of the right shoulder 63R of the strobe light base unit 63 to be in surface-contact with and connected to the upper surface of the side frame unit 64 around the screw-fastened portions. In this configuration, a moment Mz also unlikely results in deformation. The configuration allows the side frame unit 64 to stably hold the strobe light base unit 63.

Similarly, the bottom frame unit 65 and the battery holder unit 62 are fixed to each other at two points (two locations) with two screws 82*a* and 82*b*. The two screws 82*a* and 82*b* pass through through holes 65*a* and 65*b* provided on the left side of the bottom frame unit 65 when viewed from the front and are screwed into threaded holes 62*c* and 62*d* provided in the bottom surface of the battery holder unit 62. The through holes 65*a* and 65*b* and the threaded holes 62*c* and 62*d* are respectively spaced apart by a predetermined distance in the depth direction (Z direction) of the imaging apparatus 1. The two screws 82*a* and 82*b* spaced apart in the Z direction are used to fix the bottom frame unit 65 to the battery holder unit 62. In this configuration, moments Mx and My unlikely result in deformation. Further, the fastening by using the screws 82*a* and 82*b* allows the left upper surface of the bottom frame unit 65 when viewed from the front to be in surface-contact with and connected to the lower surface of the battery holder unit 62 around the screw-fastened portions. In this configuration, a moment Mz also unlikely results in deformation. The configuration allows the bottom frame unit 65 to stably hold the battery holder unit 62.

Similarly, the bottom frame unit 65 and the side frame unit 64 are fixed to each other at two points (two locations) with two screws 82*c* and 82*d*. The two screws 82*c* and 82*d* pass through through holes 65*c* and 65*d* provided on the right side of the bottom frame unit 65 when viewed from the front and are screwed into threaded holes 64*c* and 64*d* provided in the bottom surface of the side frame unit 64. The through holes 65*c* and 65*d* and the threaded holes 64*c* and 64*d* are respectively spaced apart by a predetermined distance in the depth direction (Z direction) of the imaging apparatus 1. The two screws 82*c* and 82*d* spaced apart in the Z direction are used to fix the bottom frame unit 65 to the side frame unit 64. In this configuration, moments Mx and My unlikely result in deformation. Further, the fastening by using the screws 82*c* and 82*d* allows the right upper surface of the bottom frame unit 65 when viewed from the front to be in surface-contact with and connected to the lower surface of the side frame unit 64 around the screw-fastened portions. In this configuration, a moment Mz also unlikely results in deformation. The configuration allows the bottom frame unit 65 to stably hold the side frame unit 64.

As described above, adjacent ones of the plurality of constituent units 62 to 65 are fixed to each other with screws to form the integrated, connected body 70. Specifically, each of the plurality of constituent units 62, 63, 64, and 65 is fixed to each of the adjacent units at two points spaced apart in the depth direction of the imaging apparatus 1. As a result, the connected body 70 unlikely deforms particularly due to the moments Mx and My.

Figure 9:
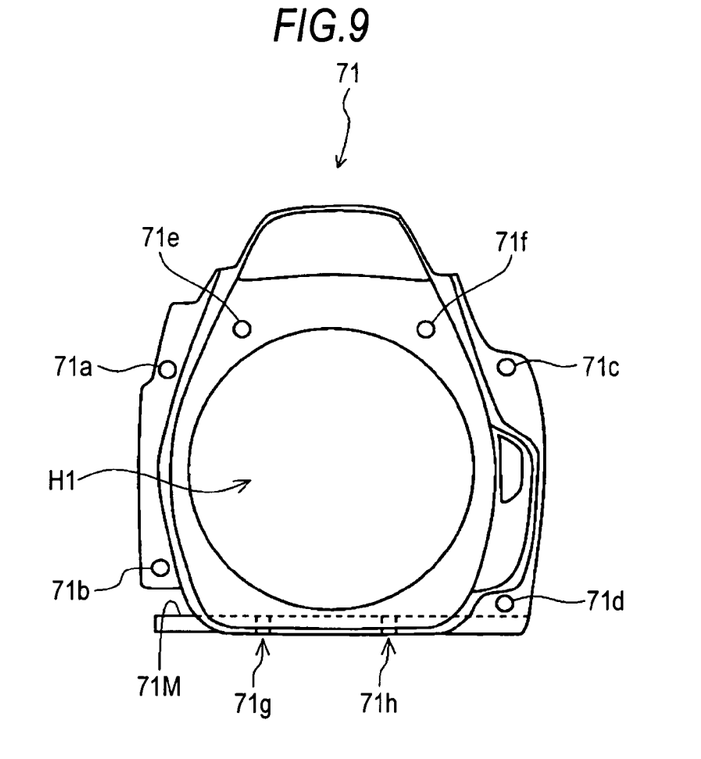
FIG. 9 is a front view of a front cover.

The camera body 2 further includes a front cover 71 (also referred to as a front member) (see also FIG. 9). The front cover 71 is an exterior member that covers the front side of the imaging apparatus 1. FIG. 9 is a front view of the front cover 71.

As shown in FIG. 8, the front cover 71 is fixed to the connected body 70 with screws or any other suitable fasteners and hence connected to and integrated with the connected body 70. Specifically, the front cover 71 is fixed to not only the front surface of the battery holder unit 62 with two screws 83*a* and 83*b* but also the front surface of the side frame unit 64 with two screws 83*c* and 83*d*.

More specifically, the two screws 83*a* and 83*b* pass through through holes 71*a* and 71*b* (see also FIG. 9) provided on the left side of the front cover 71 when viewed from the front and are screwed into threaded holes 62*e* and 62*f* provided in the front surface of the battery holder unit 62. The through holes 71*a* and 71*b* and the threaded holes 62*e* and 62*f* are respectively spaced apart by a predetermined distance in the height direction (Y direction) of the imaging apparatus 1. The two screws 83*a* and 83*b* spaced apart in the Y direction are used to fix the front cover 71 to the battery holder unit 62. In this configuration, moments Mx and Mz unlikely result in deformation. Further, the fastening by using the screws 83*a* and 83*b* allows the left rear surface of the front cover 71 when viewed from the front to be in surface-contact with and connected to the front surface of the battery holder unit 62 around the screw-fastened portions. In this configuration, a moment My also unlikely results in deformation. The configuration allows the battery holder unit 62 to stably hold the front cover 71.

Similarly, the two screws 83*c* and 83*d* pass through through holes 71*c* and 71*d* provided on the right side of the front cover 71 when viewed from the front and are screwed into threaded holes 64*e* and 64*f* provided in the front surface of the side frame unit 64. The through holes 71*c* and 71*d* and the threaded holes 64*e* and 64*f* are respectively spaced apart by a predetermined distance in the height direction (Y direction) of the imaging apparatus 1. The two screws 83*c* and 83*d* spaced apart in the Y direction are used to fix the front cover 71 to the side frame unit 64. In this configuration, moments Mx and Mz unlikely result in deformation. Further, the fastening by using the screws 83*c* and 83*d* allows the right rear surface of the front cover 71 when viewed from the front to be in surface-contact with and connected to the front surface of the side frame unit 64 around the screw-fastened portions. In this configuration, a moment My also unlikely results in deformation. The configuration allows the side frame unit 64 to stably hold the front cover 71.

The two screws 83*a* and 83*c* spaced apart in the X direction are used to fix the front cover 71 to the connected body 70. Similarly, the two screws 83*b* and 83*d* spaced apart in the X direction are used to fix the front cover 71 to the connected body 70. In this configuration, not only a moment Mz but also a moment My unlikely result in deformation.

Further, the three screws 83*a*, 83*b*, and 83*d* are used to fix the two points of the battery holder unit 62 and the one point of the side frame unit 64 to the front cover 71. In other words, the front cover 71 is fixed to the connected body at the three points. The three points of the connected body 70 will therefore not move relative to the front cover 71. Similarly, the three screws 83*a*, 83*c*, and 83*d* are used to fix the one point of the battery holder unit 62 and the two points of the side frame unit 64 to the front cover 71. The three points of the connected body 70 will also therefore not move relative to the front cover 71. As a result, the four screws 83*a*, 83*b*, 83*c*, and 83*d* are used to fix the two points of the battery holder unit 62 and the two points of the side frame unit 64 to the front cover 71. Fixing the front cover 71 to the connected body 70 this way allows the strength of the connected body 70 to be further improved. In particular, deformation due to a moment Mz unlikely occurs.

As described above, the front cover 71 is fixed to the connected body 70 (specifically, the battery holder unit 62, the side frame unit 64, and other components) and hence integrated therewith.

Further, the mirror box unit 61 is fixed to the front cover 71 with four screws 85a, 85b, 86a, and 86b.

Specifically, the front cover 71 is fixed to the front surface of the mirror box unit 61 with the two screws 85a and 85b. The two screws 85a and 85b pass through through holes 71e and 71f provided above a circular opening H1 (see also FIG. 9) of the front cover 71 and are screwed into threaded holes 61a and 61b provided in the front surface of the mirror box unit 61.

Further, the upper surface of a thin-plate-like bottom portion 71M, which is a bottom portion of the front cover 71 and protrudes toward the rear, is fixed to the lower surface of the mirror box unit 61 with the two screws 86a and 86b. Specifically, the two screws 86a and 86b pass through through holes 71g and 71h provided in the bottom portion 71M of the front cover 71 and are screwed into threaded holes 61c and 61d provided in the lower surface of the mirror box unit 61.

More specifically, the upper surface of the bottom portion 71M of the front cover 71 is fixed to the lower surface of the mirror box unit 61 with the bottom frame unit 65 interposed therebetween. Specifically, the two screws 86a and 86b pass through not only the through holes 71g and 71h but also through holes 65e and 65f provided on the front side (the side closer to the viewer when viewed from the front) of the bottom frame unit 65. That is, the screw 86a passes through the through holes 71g and 65e and is screwed into the threaded hole 61c. Similarly, the screw 86b passes through the through holes 71h and 65f and is screwed into the threaded hole 61d.

The mirror box unit 61 is thus fixed to the front cover 71. The mirror box unit 61 is therefore connected to the connected body 70 via the front cover 71.

The camera body 2 further includes other exterior members that cover the connected body 70 in the imaging apparatus 1, as shown in FIG. 6. Specifically, the camera body 2 further includes the first grip cover 72, the second grip cover 73, a first shoulder cover 74, a second shoulder cover 75, a media cover 76, the strobe light cover 77, and a rear cover 78. The covers 72 to 78 are fixed to the connected body 70 with screws or any other suitable fasteners.

The first grip cover 72 is provided on the left when the imaging apparatus 1 is viewed from the front (on the right when the imaging apparatus 1 is viewed from the rear) and primarily covers the front side of the battery holder unit 62. The second grip cover 73 is provided on the right when the imaging apparatus 1 is viewed from the front (on the left when the imaging apparatus 1 is viewed from the rear) and primarily covers the front side of the side frame unit 64. The first shoulder cover 74 is provided on the upper left when the imaging apparatus 1 is viewed from the front and primarily covers the upper side of the battery holder unit 62. The second shoulder cover 75 is provided on the upper right when the imaging apparatus 1 is viewed from the front and primarily covers the upper side of the side frame unit 64. The media cover 76 is provided on the right when the imaging apparatus 1 is viewed from the front and covers a side (particularly the vicinity of the portion where a memory card is inserted) of the side frame unit 64. The strobe light cover 77 is provided above the strobe light base unit 63. The strobe light cover 77 is provided in such a way that it can pop up from the strobe light base unit 63. The rear cover 78 is provided on the rear side of the imaging apparatus 1 and primarily covers the rear side of the connected body 70. The covers described above are fixed to the connected body 70 with screws or any other suitable fasteners.

Figure 10:
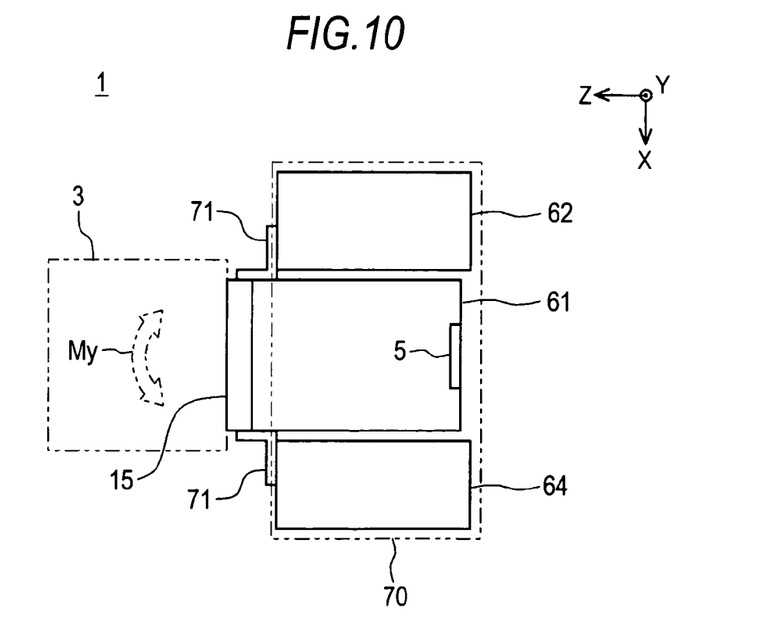
FIG. 10 is a conceptual diagram showing the internal structure of the imaging apparatus.
Figure 11:
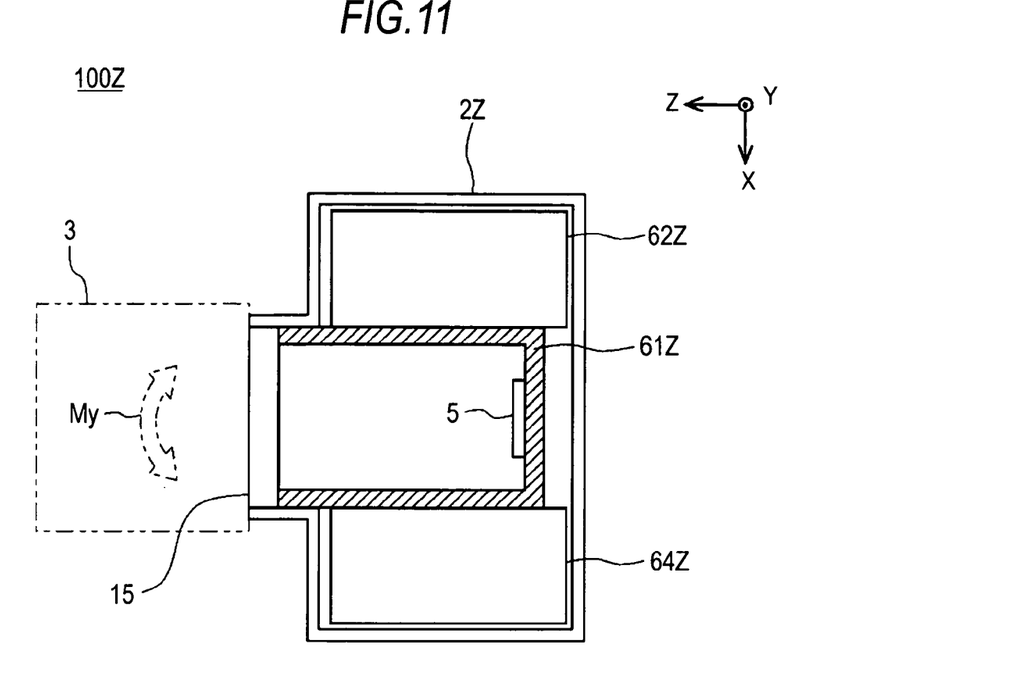
FIG. 11 shows an imaging apparatus according to Comparative Example 1.
Figure 12:
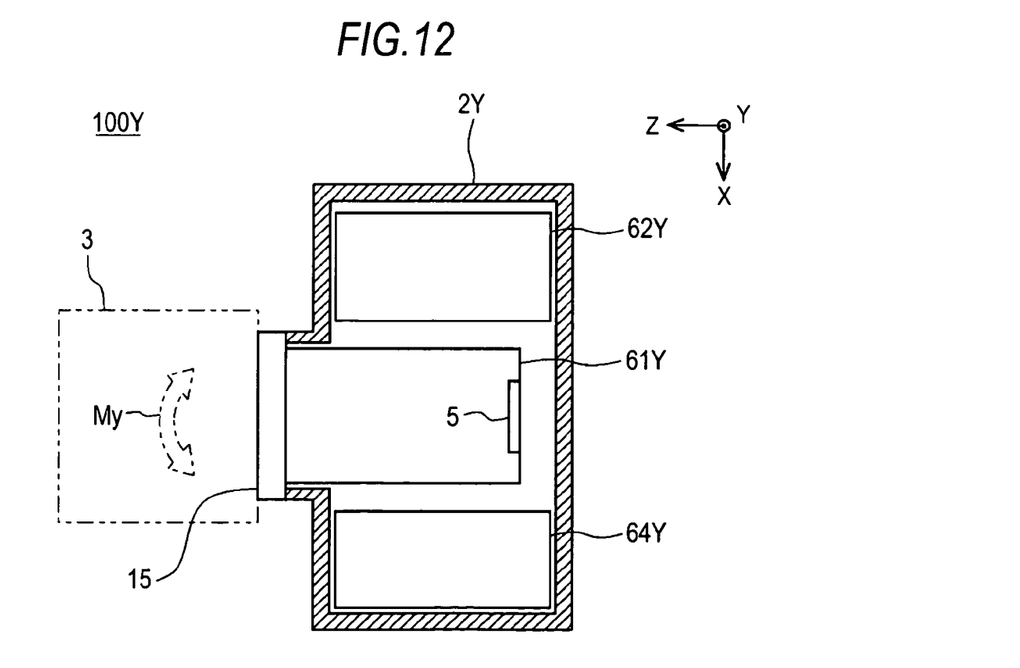
FIG. 12 shows an imaging apparatus according to Comparative Example 2.

The thus configured imaging apparatus 1 according to the present embodiment can suppress deformation resulting from an external force and be reduced in weight at the same time. This feature will be described below with reference to Comparative Examples (see FIGS. 10 to 12). FIG. 10 is a conceptual diagram showing the internal configuration of the imaging apparatus 1 according to the present embodiment. FIGS. 11 and 12 are conceptual diagrams showing the internal configurations of imaging apparatus 100Z and 100Y according to Comparative Examples. FIGS. 10 to 12 are top views of these apparatus. In FIGS. 10 to 12, primary metal parts other than the lens mount 15 are hatched.

FIG. 11 is a conceptual diagram showing the imaging apparatus 100Z according to Comparative Example 1. As shown in FIG. 11, in the imaging apparatus 100Z according to Comparative Example 1, the imaging apparatus 100Z, particularly a portion in the vicinity of the lens mount 15, is strengthened by forming the lens mount 15, a part 61Z that encloses the imaging device 5, and other components with metal materials. In other words, deformation due to moments Mx, My, and Mz, and other moments resulting from an external force applied to the vicinity of the lens mount 15 is suppressed. Further, in the imaging apparatus 100Z, a battery holder unit 62Z and a side frame unit 64Z are fixed to the part 61Z.

In the thus configured Comparative Example 1, however, since the part 61Z, which is a large part extending from the lens mount 15 to the imaging device 5, is made of a metal material, the weight of the apparatus disadvantageously increases.

FIG. 12 shows the imaging apparatus 100Y according to Comparative Example 2. As shown in FIG. 12, in the imaging apparatus 100Y according to Comparative Example 2, the imaging apparatus 100Y, particularly a portion in the vicinity of the lens mount 15, is strengthened by forming an exterior part 2Y with a metal material. The imaging apparatus 100Y has a floating structure (which will be described later). Specifically, a mirror box unit 61Y is fixed to the exterior part 2Y but is not fixed to a battery holder unit 62Y, a side frame unit 64Y, or other components.

In the thus configured Comparative Example 2, however, using the metal part (2Y), which is a relatively large part extending across the entire height and width of the imaging apparatus 100Y, also disadvantageously increases the weight of the apparatus.

In the related art described in JP-A-2004-104168 as well, the metal part (main chassis) for strengthening the imaging apparatus is disposed across nearly the entire width thereof, disadvantageously resulting in an increased weight.

On the other hand, the embodiment described above does not require such a relatively large part (for example, a metal plate extending across nearly the entire width of the imaging apparatus). In other words, the reinforcement by using a metal material can be minimized. As a result, a desired strength can be provided and the imaging apparatus can be reduced in weight at the same time.

Specifically, in the embodiment described above, the plurality of constituent units 62, 63, 64, and 65 are connected and integrated into the connected body 70, as shown, for example, in FIGS. 7 and 10. The battery holder unit 62 and other components are relatively thick also in the depth direction (Z direction) of the imaging apparatus 1. The plurality of constituent units including the thus configured battery holder unit 62 are integrated into the connected body 70. The connected body 70 can therefore be formed with a desired strength.

Further, the front cover 71 is fixed to the thus configured connected body 70, as shown, for example, in FIGS. 8 and 10. The configuration increases the strength of the connected body 70 itself and strengthens the combined body of the connected body 70 and the front cover 71.

The mirror box unit 61 is then fixed to the front cover 71. In other words, the mirror box unit 61 with the lens mount 15 is fixed to the front cover 71, which is fixed to the connected body 70.

As a result, since the mirror box unit 61 is connected via the front cover 71 to the connected body 70, which is strengthened and hence has a desired strength, deformation in the imaging apparatus 1 can be suppressed even when an external force is applied to the mirror box unit 61.

In particular, since each of the plurality of units 62, 63, and 64, which form the connected body 70, has a predetermined thickness in the depth direction, a desired strength can be readily provided without using a metal material. More specifically, since each of the plurality of constituent units 62, 63, 64, and 65 is fixed to each of the adjacent constituent units at two points spaced apart in the depth direction (Z direction) of the imaging apparatus 1, deformation due to moments Mx and My is satisfactorily suppressed.

Further, since the connected body 70 is integrated with the front cover 71, the imaging apparatus 1 is further strengthened. For example, even when a moment Mz (torsional moment around the optical axis of the imaging lens unit 3, for example) acts on the vicinity of the lens mount 15, deformation due to the moment Mz can be suppressed. It is therefore possible to prevent deformation in the imaging apparatus 1 more reliably.

Further, the connected body 70 is formed of the battery holder unit 62 and other components, and no separate metal part described above is necessary. For example, the imaging apparatus 1 according to the present embodiment does not require the metal part (that is, the metal part for providing sufficient strength) 2Y provided across nearly the entire width of the imaging apparatus 100Y according to Comparative Example 2. In other words, the metal part described above (the metal part extending across nearly the entire width to provide sufficient strength) is not required in the imaging apparatus according to the present embodiment. Similarly, the metal part 61Z provided in the imaging apparatus according to Comparative Example 1 is not required in the imaging apparatus according to the present embodiment, and the metal part provided in the imaging apparatus described in JP-A-2004-104168 is not required in the imaging apparatus according to the present embodiment. The imaging apparatus can therefore be reduced in weight.

In particular, most of the plurality of constituent units, which form the connected body 70, are made of resin materials. Specifically, the housings of most of the four constituent units (more specifically, three out of four), which form the connected body 70, are made of resin materials. Specifically, the housings of three constituent units, the battery holder unit 62, the strobe light base unit 63, and the side frame unit 64, are made of resin materials. The imaging apparatus 1 can therefore be greatly reduced in weight. Further, the cost can also be reduced, as compared with a case where the metal part according to Comparative Examples described above is made of a magnesium alloy or any other suitable relatively light metal material. In the description, among the four constituent units 62, 63, 64, and 65, which form the connected body 70, the housings of the three constituent units 62, 63 and 64 other than the bottom frame unit 65 are made of resins, but all the housings described above are not necessarily made of resins. Specifically, the housing of at least one (one, for example) of the four constituent units 62, 63, 64, and 65, which form the connected body 70, may be made of a resin, and the housings of the remaining constituent units may be made of other materials (such as a magnesium alloy).

Further, in the embodiment described above, the imaging device 5 is disposed in the mirror box unit 61, and the mirror box unit 61 and the imaging device 5 can move as a whole. The imaging device 5 will therefore not move relative to the lens mount surface. It is therefore readily and reliably possible to maintain the distance from the lens mount to the imaging surface (of the imaging device 5) (the distance is also referred to as "flange back") at a fixed value. That is, no abnormal focusing or other problems resulting from variation in flange back will occur.

Further, in the embodiment described above, the mirror box unit 61 is primarily fixed to the front cover 71 (see FIGS. 8 and 10). On the other hand, the mirror box unit is not directly fixed to the battery holder unit 62, the strobe light base unit 63, or the side frame unit 64. That is, the mirror box unit 61 is not fixed to the constituent units 62, 64, or 63 on both the right and left sides or the upper side of the mirror box unit 61. Plainly speaking, the mirror box unit 61 "floats" from the plurality of constituent units (in other words, the mirror box unit 61 has a floating structure). Therefore, even when an external force acts on the battery holder unit 62 or other components, the portion of the external force that is transferred to the mirror box unit 61 can be minimized, and hence deformation of the mirror box unit 61 itself can be minimized. It is therefore readily and reliably possible to maintain the flange back, in particular, at a fixed value.

The above embodiment has been described with reference to the case where the mirror box unit 61 is also fixed to a specific constituent unit (specifically, the bottom frame unit 65) of the four constituent units 62, 63, 64, and 65, but the mirror box unit 61 is not necessarily fixed to any specific constituent unit. For example, the mirror box unit 61 may not be directly fixed to the bottom frame unit 65 but may be directly fixed only to the front cover 71. That is, a structure in which the mirror box unit 61 is fixed to the front cover 71 but not directly fixed to any of the four constituent units 61, 62, 63, and 64 may alternatively be employed (such a structure is also referred to as a complete floating structure).

<3. Variations and Others>

An embodiment of the invention has been described above, but the invention is not limited to what has been described above.

For example, the above embodiment has been described with reference to the case where the imaging device 5 is directly fixed to the mirror box unit 61 on the rear side in the internal space in the mirror box unit 61, but the imaging device 5 is not necessarily fixed this way. Specifically, the imaging device 5 may be disposed via a hand-shake correction unit on the rear side in the internal space in the mirror box unit 61. The hand-shake correction unit may be configured, for example, in such a way that the imaging device 5 is slightly displaced in two different directions in a plane perpendicular to the optical axis (X and Y directions, for example) to cancel hand-shaking detected by an angular velocity sensor. In this configuration as well, the distance from the lens mount surface to the imaging surface of the imaging device 5 (flange back) can be readily and reliably maintained at a fixed value.

Further, the above embodiment has been described with reference to the case where each of the first grip cover and the second grip cover 73 is separate from the front cover 71, but the two grip covers are not necessarily configured this way. For example, the front cover may alternatively be configured to cover not only the portion corresponding to the front cover 71 in the above embodiment but also the portions corresponding to the first grip cover 72 and the second grip cover 73.

Similarly, the above embodiment has been described with reference to the case where each of the first shoulder cover 74 and the second shoulder cover 75 is separate from the strobe light base unit 63, but the two shoulder covers are not necessarily configured this way. For example, an integrated upper unit corresponding to all the first shoulder cover 74, the second shoulder cover 75, and the strobe light base unit 63 may be provided.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   a mount fixing member to which a lens mount is fixed;
   a connected body obtained by integrally connecting a plurality of constituent units including a battery holder unit, the plurality of constituent units provided around the mount fixing member; and
   a front member fixed to the connected body and integrated therewith,
   wherein the mount fixing member is fixed to the front member.

2. The imaging apparatus according to claim 1,
   wherein each of the plurality of constituent units is fixed to each of the adjacent constituent units at two points spaced apart in the depth direction of the imaging apparatus.

3. The imaging apparatus according to claim 1,
   wherein the front member is an exterior member that covers the front side of the imaging apparatus.

4. The imaging apparatus according to claim 1,
   wherein the mount fixing member holds an imaging device.

5. The imaging apparatus according to claim 4,
   wherein the mount fixing member is fixed to the front member and a specific constituent unit of the plurality of constituent units but is not fixed the remaining constituent units.

6. The imaging apparatus according to claim 5,
   wherein the plurality of constituent units further include a bottom frame unit provided on the bottom side of the mount fixing member, and
   the specific constituent unit is the bottom frame unit.

7. The imaging apparatus according to claim 4,
   wherein the mount fixing member is not fixed to any of the plurality of constituent units but is fixed to the front member.

8. The imaging apparatus according to claim 1,
   wherein the mount fixing member holds a reflection member that changes the path along which a subject image having passing through an imaging optical system travels.

9. The imaging apparatus according to claim 1,
   wherein at least one of the plurality of constituent units has a housing made of a resin material.

10. The imaging apparatus according to claim 1,
    wherein the battery holder unit is provided on one side of the mount fixing member,
    the plurality of constituent units further includes
    a side frame unit provided on the other side of the mount fixing member,
    an upper unit provided above the mount fixing member, and
    a lower unit provided below the mount fixing member, and
    the connected body is formed by fixing the battery holder unit to the upper unit, fixing the side frame unit to the upper unit, fixing the battery holder unit to the lower unit, and fixing the side frame unit to the lower unit.

* * * * *